C. J. RETHORN.
LAWN AND GARDEN RAKE.
APPLICATION FILED JULY 31, 1914.
1,131,553.
Patented Mar. 9, 1915.
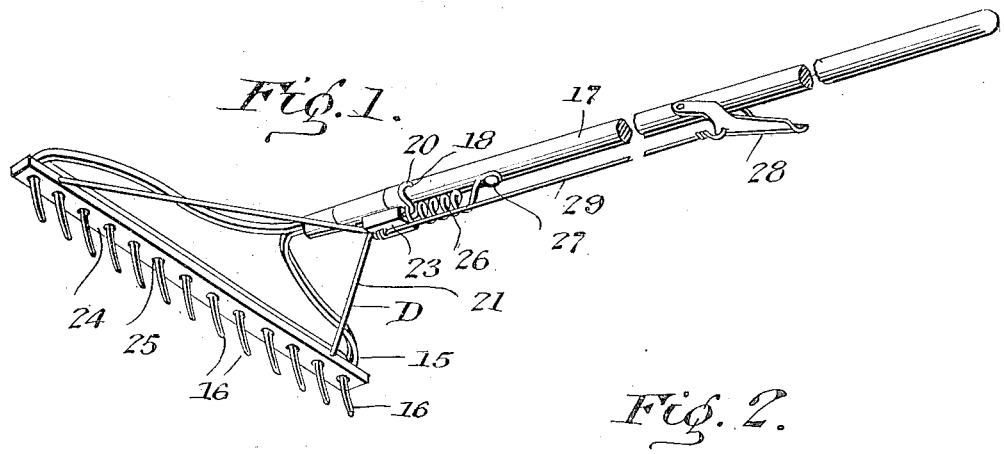
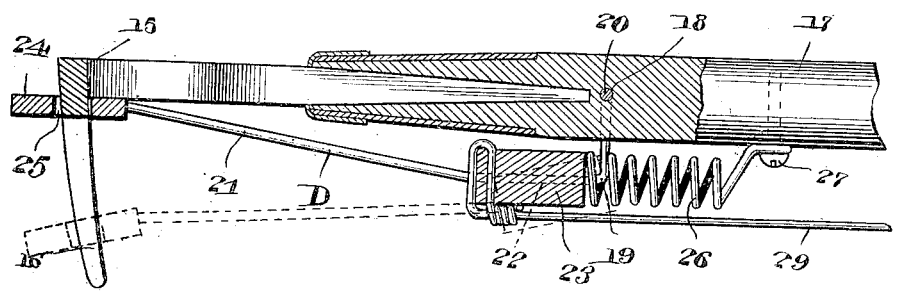
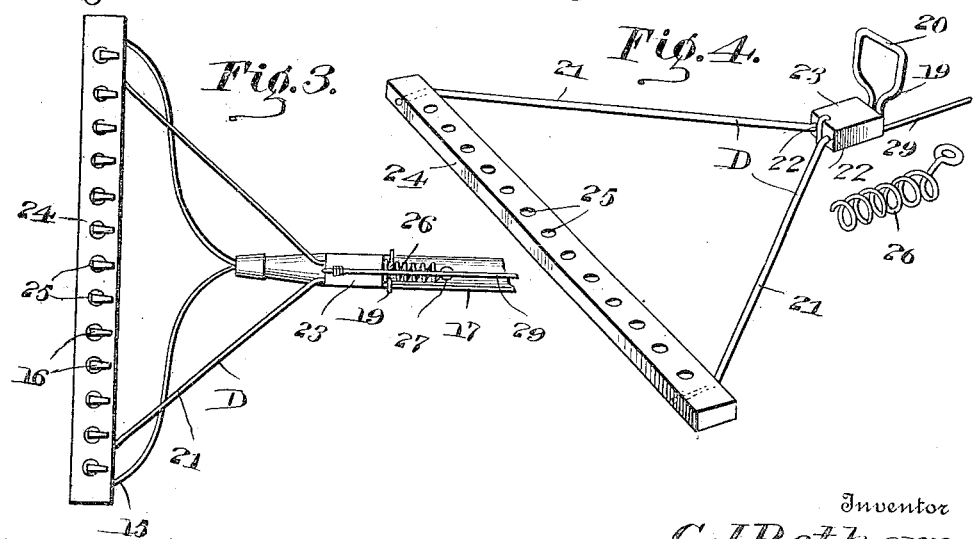
Inventor
C. J. Rethorn,
By Victor J. Evans
Attorney

UNITED STATES PATENT OFFICE.

CARL J. RETHORN, OF SHELLEY, IDAHO.

LAWN AND GARDEN RAKE.

1,131,553.  Specification of Letters Patent.  Patented Mar. 9, 1915.

Application filed July 31, 1914. Serial No. 854,352.

*To all whom it may concern:*

Be it known that I, CARL J. RETHORN, a citizen of the United States, residing at Shelley, in the county of Bingham and State of Idaho, have invented new and useful Improvements in Lawn and Garden Rakes, of which the following is a specification.

This invention relates to lawn and garden rakes, and it has for its object to produce a rake having means of simple and improved construction whereby the teeth of the rake will be cleaned and freed from leaves and other refuse that is apt to accumulate on a rake.

A further object of the invention is to produce a simple and effective device of the class described including a spring actuated member mounted on the rake teeth and adapted to be moved in an outward direction thereon, thereby removing from the rake teeth leaves, weeds and other refuse that may have become impaled thereon.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a perspective view of a rake equipped with the improved cleaning device. Fig. 2 is a longitudinal sectional view taken through the lower end of the handle and the rake head. Fig. 3 is a detail plan view with parts broken away. Fig. 4 is a view showing the parts of the device separated from the rake.

Corresponding parts in the several figures are denoted by like characters of reference.

The rake head 15 which is provided with teeth 16 is mounted in the customary manner at the end of the handle 17, said handle being provided near the head with a transverse aperture 18 which is substantially parallel to the rake head.

D is a yoke formed of a light metallic rod or wire which is bent to form midway between the ends thereof a loop 19 having a bridge piece 20 that engages the aperture 18, said loop being bent substantially at right angles to the limbs 21 which diverge outwardly with respect to each other, said limbs, however, being first extended through the bores 22 of a block 23 which is mounted on the said limbs between the loop 19 and the divergent portions of the limbs. Mounted on the ends of the limbs 21 is a strip 24 having apertures 25 that engage the rake teeth.

26 is a coiled spring which is connected at one of its ends with the loop portion of the yoke D adjacent to one end of the block 23, the other end of said spring being connected with a support, such as a screw or bolt 27 connected with the handle 17. The stress exerted by the spring 26 against the block 23 will serve to rock the yoke D about the axis of the bridge piece 20 of the loop 19, thereby forcing the apertured strip 24 engaging the rake teeth in the direction of the head 15.

A lever 28 which is fulcrumed on the handle is connected by a wire or other flexible connection 29 with the block 23 in such fashion that when manipulating the lever, the yoke may be rocked against the tension of the spring 26. It will be seen that when the yoke is thus rocked, the apertured strip 24 will be moved outwardly on the rake teeth 16, thereby pushing from said teeth any leaves, straw and the like that may have become impaled thereon or entangled therewith. When the rake has thus been cleaned, the lever is released and the parts will be restored to their normal position by the action of the spring 26. It will be understood that in constructing and assembling the improved device, the rod or wire of which the yoke D is formed is first passed through the aperture 18 of the rake handle which aperture, in order that the parts shall operate properly, must be parallel to the rake head. After inserting the rod or wire through the aperture the end portions thereof are bent until they lie close together to enable the block 23 to be mounted thereon. After pushing the block as close to the rake handle as may conveniently be done, the limbs 21 are spread divergently, thereby holding the block against displacement. By grasping hold of the block the rod or wire may now be bent until the loop portion 19 lies substantially at right angles to the limbs 21, and the strip 24 may now be mounted on the ends of the limbs in any convenient manner. The strip 21, as well as the block 23, may be made of hard wood, metal or any other material that is deemed suitable for the purpose.

Having thus described the invention, what is claimed as new, is:—

The combination with a rake having a head provided with teeth and a handle provided with a transverse aperture parallel to the rake head, of a yoke including a loop having a bridge piece engaging the aperture of the handle, and divergent limbs lying in a plane substantially at right angles to the loop, a block having longitudinal bores engaging the limbs between the loop and the divergent portions of said limbs, an abutment on the rake handle, a spring interposed between said abutment and the block, an apertured strip carried by the yoke and engaging the rake teeth, and means for tilting the yoke against the tension of the spring.

In testimony whereof I affix my signature in presence of two witnesses.

CARL J. RETHORN.

Witnesses:
DON E. SANDERSON,
SOREN GORGESEN.

Copies of this patent may be obtained for five cents each, by addressing the "Commissioner of Patents, Washington, D. C."